Jan. 26, 1926.

N. T. ALBRIGHT

SHOCK ABSORBER

Filed July 14, 1924

1,570,606

INVENTOR.
NEIL T. ALBRIGHT,

BY

ATTORNEYS.

Patented Jan. 26, 1926.

1,570,606

UNITED STATES PATENT OFFICE.

NEIL T. ALBRIGHT, OF KOKOMO, INDIANA, ASSIGNOR TO KOKOMO AUTOMOTIVE MANUFACTURING COMPANY, OF KOKOMO, INDIANA, A CORPORATION.

SHOCK ABSORBER.

Application filed July 14, 1924. Serial No. 725,918.

*To all whom it may concern:*

Be it known that I, NEIL T. ALBRIGHT, a citizen of the United States, and a resident of Kokomo, county of Howard, and State of Indiana, have invented a certain new and useful Shock Absorber; and I do hereby declare that the following is a full, clear, and exact description thereof, reference being had to the accompanying drawings, in which like numerals refer to like parts.

This invention relates to a shock absorber or snubber for motor vehicles of the friction type, wherein a slight resistance is offered to the compression of the vehicle springs and a substantial resistance is offered to their expansion for checking the rebound of the vehicle body.

The principal object of the invention resides in the structural arrangement of that character of snubber employing a pair of brake shoes between which a metallic strap is interposed and frictionally resisted.

One feature of the invention resides in the double roller wedge or clutch employed for applying a resisting force directly to the opposite ends of the movable brake shoe. Such double wedging action causes a more positive application of friction by said movable brake shoe to the friction strap, than heretofore, where a single roller wedge has been employed.

Another feature of the invention resides in the means for varying the friction engagement, and resistance between the movable shoe and the friction strap, consisting of a screw threaded bolt accessible from the outside of the casing for adjustment, and adapted to screw through the lower end of the casing for yieldingly maintaining the movable shoe in frictional engagement with the friction strap under adjustable spring tension.

Figure 1:
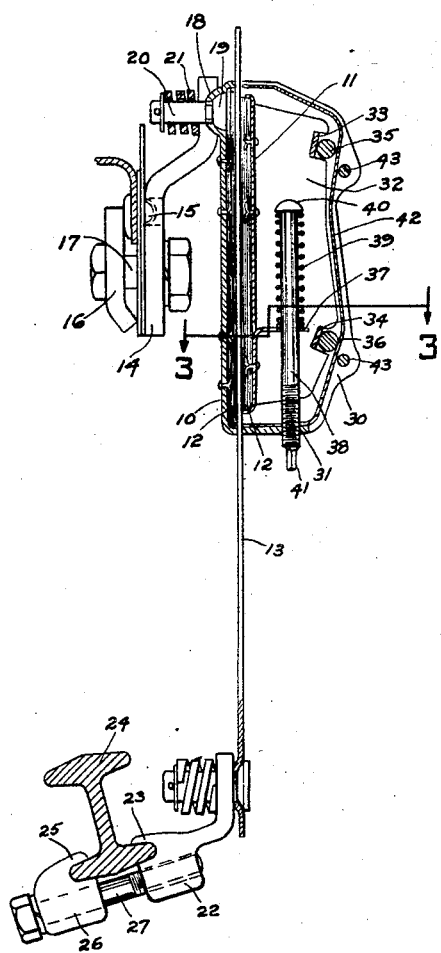
Figure 2:
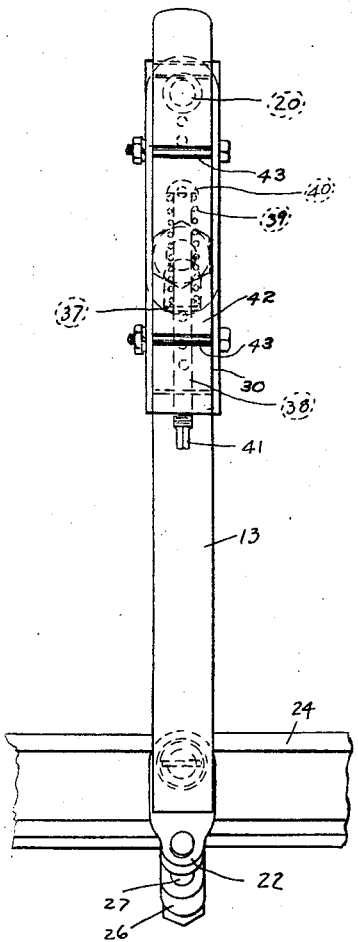
Figure 3:
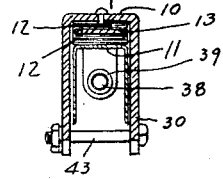

The full nature of the invention will be understood from the accompanying drawings and the following description and claims:

Fig. 1 is a central vertical section taken through the snubber and showing it attached to the upper and lower members of the vehicle. Fig. 2 is a front elevation thereof. Fig. 3 is a section taken on a line of 3—3 of Fig. 1.

In the drawings there is shown a snubber comprising a stationary brake shoe 10 and a movable brake shoe 11, each of which are provided with friction or brake lining 12 and between which there is slidably mounted the friction strap or plate 13. The stationary brake shoe 10 is connected with one of the vehicle members, preferably the body member by means of a suitable clamp to which it is secured. Said clamp comprises the member 14 which is provided with a recess in the clamping face thereof adapted to be positioned over one of the rivet heads 15 of the vehicle body structure. The clamping member 16 is positioned to engage the other side thereof and be drawn tightly against and in clamping engagement with the vehicle by the bolt 17. The stationary shoe 10 is provided with a recessed portion 18 for receiving the rounded head 19 of the bolt 20 which extends through the clamping plate 14, the end of which is yieldingly held in spaced relation thereto by the spiral spring 21. Said member 14 being provided with a rounded recess to accommodate a corresponding projection on the shoe 10, whereby said shoe will have a semi-universal connection with the clamping member and vehicle body.

On the other hand, one end of the strap 13 is in like manner connected with the clamping member 22, which member is provided with a jaw portion 23 adapted to receive the lower edge of the channel iron axle bar 24 of the chassis frame, the opposite edge thereof being engaged by the jaw 25 of the clamping member 26. Both members are held in clamping engagement with the axle by means of the bolt 27.

The stationary shoe 10 is formed of heavy sheet metal from which the sides 30 of the housing are bent outwardly at right angles, said sides embracing the movable shoe 11. A bottom end plate 31 is also formed integral with the stationary shoe 10 and the side plates 30, the said bottom end plate allowing for a suitable slot through which the friction strap 13 may reciprocate.

The movable shoe 11 is formed from sheet metal stamping provided with side flanges 32 turned at right angles thereto, said flanges being provided with the notches 33 and 34 for receiving the rollers 35 and 36 respectively. The metal cut from said notches is turned inwardly so as to extend between said side flanges for providing bearing surfaces for said rollers. Stamped from the body portion of the shoe 11 there is an outwardly extending ear 37 through which the bolt 38 extends, said bolt being surrounded by spiral spring 39 positioned between said ear and a bolt head 40. The other end of said bolt is screw threaded and is adapted to screw through the end plate 31 so that the tool receiving end 41 will be accessible exterior of the casing.

Mounted between the sides 30 of said casing there is a cover 42 provided with raceways for said rollers extending at an angle to said shoes as shown in Fig. 1. It will be noted that said raceways upon which said rollers are adapted to ride, are substantially parallel in extension and sloped downwardly toward said shoes so that during the reciprocal movement of the movable shoe, the rollers will be maintained together in a plane at all times parallel to the plane through the stationary shoe. Obviously the position of the rollers controls the position of the movable shoe through the walls 32.

The covering 42 is held in place against the force exerted by the rollers by means of the bolt 43 extending transversally across the face thereof through the projecting ears formed on the side walls 30 of the casing. Furthermore, said cover is held in position against said bolts by contact of the rollers.

In operation, as the body and chassis of the vehicle come together, as shown herein, the strap 13 will move upwardly with respect to the brake shoes. This will tend to force the movable brake shoe 11 upwardly causing the rollers to ride upwardly on the cover 42 so that the pressure exerted between the shoes is released. This permits relatively free upward movement of the strap, although by adjusting the bolt 38 the tension of the spring 39 will maintain the movable shoe in position to exert a slight frictional resistance. Such relatively slight resistance is effective in preventing the body and chassis coming together by reason of an unusual shock. Therefore, as distinguished from snubbers of the usual type employing a flexible strap, there is a resistance to the downward movement of the body. Upon the rebound, as the body moves away from the spring, the strap will be caused to move downwardly with respect to the brake shoes, and by reason of the relatively slight frictional contact of the movable shoe, through tension of the spring 39, the strap will carry said movable shoe downwardly with it, causing both rollers 34 and 35 to roll downwardly on the inclined surface of the cover, thereby forcing or wedging said movable shoe inwardly against said strap and stationary shoe. This immediately exerts an appreciable frictional resistance to the strap which increases as the strap is pulled down or the body continues in its rebound movement, until such time as such resistance completely arrests the rebound. This movement of the movable shoe is further assisted by the tension of the spring 39, wherefore the adjustment of the tension of said spring by means of turning the bolt 38, is adapted to increase or decrease the frictional resistance on the rebound, as well as control the frictional resistance when the body and chassis come together. It will particularly be noted that by reason of the double rollers a substantially direct resistance is imparted to both the upper and lower ends of the movable shoe, thereby equally distributing the frictional contact with the friction plate throughout the entire surface thereof rather than a portion thereof as heretofore.

The invention claimed is:

1. In a shock absorber of the character described, a stationary friction member, a movable friction member, a wedging roller associated with said movable friction member, a member associated with said stationary friction member provided with an inclined surface and so positioned as to be engaged by said roller and wedging said friction members together when said movable member is moved in one direction, and releasing the same when moved in the other direction, a bolt adjustably mounted with respect to said stationary member, an ear projecting from said movable member through which said bolt slidably extends, and a spring secured between said ear and the free end of said bolt for normally maintaining said movable member and wedging roller in operative position under spring tension.

2. A shock absorber of the character described, a stationary member having flanges formed thereon and extending at right angles thereto for providing a pair of side walls, a movable friction member having a pair of flanges formed thereon and extending at right angles thereto so as to lie adjacent said casing side walls, said flanges being provided with a recess formed adjacent each end thereof, a wedging roller mounted in said recess, a cover plate positioned between said side walls and having an inclined surface adapted to be engaged by said roller for forcing said movable member into frictional engagement when moved in one direction, means mounted in said side walls for maintaining said cover member in operative and inclosing position, a bolt adjustably mounted with respect to said stationary member, an ear projecting from said movable member through which said bolt slidably extends, and a spring secured between said ear and the free end of said bolt for normally maintaining said movable member in operative position under spring tension.

3. In a shock absorber of the character described, a stationary friction member, a movable friction member, a wedging roller associated with said movable friction member adjacent one end thereof, a second wedging roller associated therewith adjacent the other end thereof and a member associated with said stationary friction member provided with a pair of inclined surfaces spaced apart and extending in substantially parallel planes to each other and positioned to be engaged respectively by said rollers for wedging said friction members together when said movable member is moved in one direction and releasing the same when moved in the other direction, a bolt adjustably mounted with respect to said stationary member, an ear projecting from said movable member through which said bolt slidably extends and a spring secured between said ear and the free end of said bolt for normally maintaining said movable member and wedging rollers in operative position under spring tension.

4. In a shock absorber of the character described, a stationary friction member having flanges formed thereon and extending at right angles thereto for providing a pair of side walls, a movable friction member having a pair of flanges formed thereon and extending at right angles thereto so as to lie adjacent said casing side walls, said flanges being provided with a recess formed adjacent each end thereof, wedging rollers mounted in each of said recesses, a cover plate positioned between said side walls and having a pair of spaced inclined surfaces adapted to be engaged by said rollers for forcing said movable member into frictional engagement when moved in one direction and means mounted in said side walls for maintaining said cover member in operative and inclosing position.

5. In a shock absorber of the character described, a stationary friction member having flanges formed thereon and extending at right angles thereto for providing a pair of side walls, a movable friction member having a pair of flanges formed thereon and extending at right angles thereto so as to lie adjacent said casing side walls, said flanges being provided with a recess formed adjacent each end thereof, wedging rollers mounted in each of said recesses, a cover plate positioned between said side walls and having a pair of spaced inclined surfaces adapted to be engaged by said rollers for forcing said movable member into frictional engagement when moved in one direction, means mounted in said side walls for maintaining said cover member in operative and inclosing position, and means for yieldingly maintaining said movable friction member and wedging rollers in operative position.

6. In a shock absorber of the character described, a stationary friction member having flanges formed thereon and extending at right angles thereto for providing a pair of side walls, a movable friction member having a pair of flanges formed thereon and extending at right angles thereto so as to lie adjacent said casing side walls, said flanges being provided with a recess formed adjacent each end thereof, wedging rollers mounted in each of said recesses, a cover plate positioned between said side walls and having a pair of spaced inclined surfaces adapted to be engaged by said rollers for forcing said movable member into frictional engagement when moved in one direction, means mounted in said side walls for maintaining said cover member in operative and inclosing position, a bolt adjustably mounted with respect to said stationary member, an ear projecting from said movable member through which said bolt slidably extends and a spring secured between said ear and the free end of said bolt for normally maintaining said movable member in operative position under spring tension.

7. In a shock absorber of the character described, a stationary friction member, an inclosing casing mounted thereon, a movable friction member mounted in said casing, a friction plate frictionally engageable between said members, means for wedging said movable member into frictional engagement with said plate when moved in one direction and releasing the same when moved in the other direction, and adjustable yielding means associated with said movable member for normally maintaining it in frictional engagement with said friction plate and yieldingly resisting its movement to non-engaging position.

8. In a shock absorber of the character described, a stationary friction member, an inclosing casing mounted thereon, a movable friction member mounted in said casing, a friction plate frictionally engageable between said members, means for wedging said movable member into frictional engagement with said plate when moved in one direction and releasing the same when moved in the other direction, a projection on said movable member, a bolt slidably extending through said projection and adapted to screw in and out of one end of said casing, and a spiral spring surrounding said bolt and positioned between the free end thereof and said projection, the tension of said spring being varied by the adjustment of said bolt in the end of said casing to yieldingly maintain said movable friction member normally in frictional engagement with said friction plate and resist by the tension thereof the movement of said member out of frictional engagement with said plate.

In witness whereof, I have hereunto affixed my signature.

NEIL T. ALBRIGHT.